United States Patent [19]
Jäger

[11] 4,085,888
[45] Apr. 25, 1978

[54] PROCESS AND APPARATUS FOR THE TREATMENT OF SUSPENSIONS

[75] Inventor: Ernst Adolf Jäger, Vilsbiburg, Germany

[73] Assignee: Flottweg-Werk Dr. Georg Bruckmayer GmbH & Co. KG, Germany

[21] Appl. No.: 743,076

[22] Filed: Nov. 18, 1976

[30] Foreign Application Priority Data

Nov. 18, 1975 Germany .............................. 2551789

[51] Int. Cl.² .......................... B04B 1/20; B04B 9/10; B04B 11/02
[52] U.S. Cl. ..................................... 233/7; 233/19 A; 233/24
[58] Field of Search .................. 233/7, 23 R, 24, 19 R, 233/19 A, 20 R, 20 A, 27

[56] References Cited

U.S. PATENT DOCUMENTS

| | | | |
|---|---|---|---|
| 2,867,378 | 1/1959 | Harlow | 233/24 X |
| 3,126,337 | 3/1964 | Smith | 233/7 X |
| 3,494,542 | 2/1970 | Craig et al. | 233/7 |
| 3,734,399 | 5/1973 | Oas | 233/24 X |
| 3,923,241 | 12/1975 | Cyphelly | 233/7 |
| 3,957,197 | 5/1976 | Sartory et al. | 233/19 R |

*Primary Examiner*—George H. Krizmanich
*Attorney, Agent, or Firm*—Craig & Antonelli

[57] ABSTRACT

A process and apparatus for continuous treatment of suspensions which include solid matter difficult to decant such as solid matter tending to plasticize under temperature and/or pressure loads, solid matter having a rheopexy behavior, and solid matter having at least one of high water absorption and low specific gravity differences with respect to the liquid of the suspension. The apparatus includes a solid-shell screw-conveyor centrifuge system having a rotatable screw and rotatable shell with one of the screw and shell being driven by a drive mechanism and the other of the shell and screw being joined by a hydraulic motor. A control system is provided for controlling at least one of the differential speed between the screw and shell and the speed of the shell in dependence upon the nature of the suspension being processed.

39 Claims, 3 Drawing Figures

PROCESS AND APPARATUS FOR THE TREATMENT OF SUSPENSIONS

The present invention relates to a process and apparatus for the treatment of suspensions which are particularly difficult to decant and which employs a solid-shell screw-conveyor centrifuge with a screw rotating at a differential speed with respect to the rotatable shell part. One of the shell or the screw is connected to a drive mechanism while the other is driven by way of a hydraulic motor supplied by means of a rotary transmission.

In one proposed solid-shell screw-type conveyor centrifuge described in Offenlegungsschrift 24, 32, 284 and U.S. Pat. No. 3,923,241, the differential speed between the shell and screw are controlled manually. By virtue of this control, it is possible to adjust the differential speed so that such speed conforms to the consistency and the separating conditions of the suspension to be processed in any given situation. A disadvantage of the manual control resides in the fact that, if a suspension is obtained with differing consistency, as is the case, for example, with sewage sludge, the operation of the centrifuge must be constantly monitored and a hydraulic motor arranged between the shell and screw must be controlled with respect to the amount and/or pressure of the pressure medium fed to the hydraulic motor.

While it is possible, for example, when the screw is subjected to an increased load, to affect the amount of pressure fluid supplied to the hydraulic motor manually, an increase in the load on the screw and/or an increase in the torque output of the screw results in a pressure increase in the hydraulic motor and the elements connected to the motor which carry the hydraulic fluid. This pressure increase results in an enlarged quantity of leakage fluid which, in turn, leads to a reduction in the differential speed between the screw and the shell.

Unfortunately, a reduction in the differential speed further causes an increase in the proportion of solids within the separating chamber, which means that the torque at the screw will be further increased. The resulting pressure increase further raises the amount of leakage fluid, thereby further reducing the differential speed. Finally, this multiple feedback effect results in a clogging of the machine because the differential speed between the shell and the screw becomes too low.

Yet it is possible that the condition which is responsible for controlling the leakage fluid and the condition of the screw load may compensate each other in such a way that a stable operating condition is attained; this is extensively dependent upon the respective operating conditions and is predictable in only the rarest conditions, if at all, when the operating point of the machine is reached and when its operating condition becomes stable. However, typically, the operation of the proposed machine must be monitored constantly and the quantity of the pressure fluid supplied to the machine must be manually controlled. Of course, this monitoring does not include the use of devices which prevent the supply of effluent in the case of overload conditions and/or which shut off the entire plant in such an occurrence.

To ensure a continuous operating condition of the centrifuge when processing a suspension with differing consistency, it is possible to provide differential speed and/or torque control means. The working efficiency of the centrifuge can be adjusted to an optimum without having to provide heretofore necessary, large safety margins in the torque and/or volume output of the centrifuge. In such situations, the desired value of the differential speed is governed by a value dimensioned according to a critical value related to the specific suspension being processed and, when this value is exceeded or when the actual value falls short of the desired value, the differential speed between the shell and the screw may be controlled so that the desired value is once again restored. The determination of the critical values can be effected by suitable measuring operations or it is also possible to have the desired value of the differential speed fixedly predetermined by virtue of the nature of the suspension being processed.

The aim underlying the present invention essentially resides in providing a processing apparatus for the treatment of suspensions, the peculiarity of which makes it particularly difficult to subject them to a separating step.

A first group of suspensions which are difficult to separate or decant consists of those wherein the solids already tend to change their physical condition toward the liquid phase or tend to solidify into larger units within a given range of thermal and/or mechanical load. In order to maintain the centrifuge operation and/or any subsequent working steps, it is necessary that both of the above phenomena be absolutely avoided.

One example of a suspension which is difficult to decant by virtue of the fact that the solids tend to soften or change their physical condition to the liquid phase can be found in the manufacture of a thermoplastic synthetic resin, especially polyvinylchloride. Specifically, the synthetic resin particles are present as precipitated products in a solution and are fed in the form of a suspension to the centrifuge in order to separate the synthetic resin particles as solid matter. This separating step, first of all, determines the speed of the shell as a variable which, so far, is constant. The rotational speed of the shell and, hence, the required centrifugal force necessary to separate the solid matter from the solution in the suspension is determined by considering the specific gravity ratio between the solid matter and the solution. To provide an economical operation and to attain a satisfactory degree of drying of the solid matter, it is desirable to accumulate a relatively large amount of solids in the conveying channels of the screw, namely, in a zone wherein the solids are discharged from a pool into a separating chamber of the centrifuge. With a desired optimum accumulation of solids, advantageously the accumulation extends in the conveying direction out of the pool at a relatively early point in time so that a drying zone following the pool and extending to the discharge can then be sufficient to enhance the degree of drying of the solid matter, depending on the product, for example, to about 10% residual moisture or less.

The actual amount of the accumulation of solids in the centrifuge is a function of the differential speed between the screw and the shell and also depends upon the consistency of the suspension which is introduced into the centrifuge, which consistency is subject to fluctuations.

The pressure exerted on the solid matter toward plasticization thereof is determined by the shell speed and also by the amount of suspension which is fed to the centrifuge. The bowl speed yields the centrifugal force component and the degree of filling determines the pressure load exerted by the screw. If the solid matter collecting in the conveying channels of the screw exceeds a predetermined volume due to a non-continuous operating condition of the centrifuge, the accumulation of the solid matter may increase due to the limited conveying power of the screw. The increase in accumulation of the solid matter may reach a point at which insufficient space exists in the conveying channels, whereby the pressure in the centrifuge rises suddenly upon the occurrence of a certain degree of filling. The occurrence of this phenomenon resulted in a plasticization of the synthetic resin and, consequently, in a breakdown of the machine as well as in an interruption in the other systems responsible for further processing of the suspension insofar as these other systems were fed with the plasticized synthetic resin. Since the load on the solid matter increases, as viewed from the hub of the screw toward an inner wall of the shell, the plasticizing phenomenon occurs along the inner wall.

In addition to the pressure load, temperature is also an influential variable for plasticization of the solid matter from a thermoplastic synthetic resin. The temperature consideration consists of the normal operating temperature and/or the temperature ambient within the centrifuge and a temperature component stemming from a friction effect which is a function of the filling pressure of the centrifuge and the frictional speed of the screw.

The frictional speed of the screw is proportional to the differential speed between the screw and the bowl; therefore, if the differential speed is increased, the frictional speed rises, thereby resulting in one of the factors of the friction effect being increased. Consequently, an increase in the differential speed would lead initially to an increased temperature load on the synthetic resin.

With regard to the filling pressure of the centrifuge, such pressure is dependent upon the bowl speed and the degree of filling and such filling pressure has the same influential effect as the pressure exerted on the solid matter toward plasticization thereof. Assuming that the bowl speed, in case of a specific suspension, is set to be constant at a suitable value and remains constant, independently of fluctuations in the suspension, the degree of filling of the centrifuge must be varied.

The degree of filling is a function of the proportion between the required conveying volume and the actual conveying volume. The required conveying volume defines the limit of the centrifuge and, if such limit is exceeded, plasticization occurs because of the large accumulation of the synthetic resin in the conveying channels of the screw. Upon the occurrence of the large accumulation of the synthetic resin, a sudden pressure rise in the centrifuge occurs, thereby adversely affecting the further separation of the solid matter from the solution.

The required conveying volume of the centrifuge depends on the specific nature of the solid matter, the desired degree of separation, and the amount of solid matter to be processed per unit of time, whereas the actual conveying volume is proportional to the differential speed and must be maintained at a value above the required conveying volume. If the actual conveying volume drops to or below the required conveying volume, the conveying channels of the screws become crowded or filled with the solid matter, thereby resulting in the danger of plasticization of the solid matter.

The above-noted description of the various effects and dangers of plasticizing of the solid matter clearly points out that an optimum operation of the centrifuge is impossible with the heretofore employed constant or manually adjustable differential speed controls of the centrifuge. In the proposed constructions, safety precautions had to be taken with respect to the conveying volume, thereby resulting in a filling of the machine with an amount of the suspension which was far below the optimum amount, causing a correspondingly poor separating efficiency.

The present invention avoids the drawbacks and shortcomings of the prior art by providing a process and apparatus for the continuous separation of suspensions having solids which tend to plasticize under temperature and/or presuure loads, especially thermoplastic synthetic resin particles contained in a solution.

In accordance with one feature of the present invention, a solid-shell screw-conveyor centrifuge is provided having a screw which rotates at a differential speed with respect to a rotatable shell with one of the screw or shell being connected to an arbitrary drive mechanism and being joined to the other part by way of an interposed hydraulic motor supplied by way of a rotary transmission. In the centrifuge of the present invention, the suspension forms a hollow-cylindrical pool in a separating chamber between a hub of the screw and a wall of the rotating shell. The surface of the hollow-cylindrical pool facing the axis of rotation terminates at the shell wall in a conical zone of the shell at a position upstream of a discharge opening for the solid matter.

In accordance with another feature of the present invention, the hydraulic motor is initially set by a correspondingly throttled pressure medium supply at a low value so that the solid matter accumulates in the zone of the pool end upstream of the discharge opening in the screw channels at an optimum height at which the temperature and/or pressure load exerted on the solid matter is slightly below the load at which the solid matter begins to plasticize.

Upon the solid matter reaching the optimum height, according to the present invention, the supply of pressure medium to the hydraulic motor is increased in response to a signal indicating the existence of the optimum height so that, due to the increasing differential speed and increased discharge of solid matter, the optimum height of the accumulation of solid matter is not exceeded. The increased supply of the pressure medium is continued until the height of the solid matter drops below the optimum height, whereby a signal to that effect is provided so that the differential speed between the shell and the screw is varied until the optimum height of the solid matter is once again attained.

If the accumulation of solid matter in the centrifuge exceeds the optimum height, a point of overfilling is approached, at which point the pressure exerted on the accumulated solid matter increases suddenly; however, by providing a corresponding scanning system for scanning the operating pressure in the conveying channels and/or of the torque of the screw in accordance with the present invention, the actual conveying volume may be increased by increasing the differential speed between the shell and the screw so that an increase in discharge of solid matter from the centrifuge is realized, thereby reducing the volume of accumulated solid matter in the conveyor screw chamber. By virtue of this fact, the filling pressure in the centrifuge drops, leading to a reduction in the temperature of the load.

When one considers the total effect of the above-noted influencing variables in processing a suspension, it can be appreciated that the increase in the frictional speed due to the increase in the differential speed necessary to raise the actual conveying volume with respect to the total load exerted on the solid matter tending to plasticize such solid matter is not as significant a value as the reduction of the filling pressure. This fact can be more clearly realized by considering that, when the conveying channels are completely filled with solid matter, the frictional load on the solid matter depends no longer on the differential speed, but decisively on the suddenly increasing pressure in the completely filled walls of the centrifuge.

By utilizing a solid-shell screw-conveyor centrifuge and controlling the same in the manner described hereinabove, it is possible to maintain the accumulation of solid matter in the conveying channels of the screw at an optimum value, even if the suspension being processed possesses a fluctuating consistency, whereby the production of a relatively dry solid matter is realized without the danger of plasticizing of the solid matter.

As noted above, the shell speed exerts a load on the accumulated solid matter, which load is practically unavoidable due to the centrifugal force which is required for a separating operation of the suspension. To control the specific value of the load forces acting upon the solid matter, the speed of the shell can be controlled. Thus, it would be possible to reduce the bowl speed in situations wherein an overfilling or overcrowding of the conveying channels of the screw by solid matter occurs. This reduction of the bowl speed results in a corresponding reduction in the centrifugal forces acting upon the solid matter. The reduction in the centrifugal forces acting upon the solid matter would permit the solid matter to be discharged more readily since less energy is required for movement of the solid matter in the conveying direction by the screw.

The respective speeds of the shell and the load effects on the solid material at such speeds define a load curve which can only be shifted in total in a downward direction; however, a strong reduction of the bowl speed would naturally interfere with the conveying operation of the solid matter. To compensate for such interference, it would then be necessary to throttle the feeding of the suspension into the centrifuge.

According to yet another advantageous feature of the present invention, a shell drive mechanism includes a hydraulic motor which is employed in the control process regulating the speed of the shell when the solid matter accumulation exceeds a desired value or level. By virtue of the provision of a hydraulic motor, the total control process of the centrifuge can be effected with great sensitivity and/or it is possible to more readily counter any sudden and rather large accumulations of solid matter. Consequently, in accordance with the present invention, it is possible, as the critical point of overfilling is rapidly approached, to increase the differential speed of the screw as well as to reduce the speed of the shell.

By providing a hydraulic motor for the shell drive mechanism and utilizing such hydraulic motor in the control process for controlling the shell drive, the hydraulic motor can be operated, without difficulties, as a pump driven by the shell. When the hydraulic motor functions as a pump, a resistance acts upon the shell, thereby effecting a braking torque on the shell to permit a more rapid reduction of the speed of the shell.

In another type of suspension, the solids have a rheopexy behavior, that is, they solidify to an increasing extent due to mechanical stress. An example of such a substance obtained by decanting is starch.

Specifically, when processing starch, a solidification occurs if the conveying movement becomes too violent or rapid. To prevent any clogging due to such solidification and to maintain the separating ability of the centrifuge, the discharge movement of the solid matter must be reduced. This reduction can only be effected, in case of a fixed differential speed, by completely turning off the centrifuge. On the other hand, with manual control, the reduction in discharge movement can only be accomplished with constant monitoring and some delay. As can be appreciated, either the turning off of the centrifuge or the delay occasioned by manual control in the treatment of starch in conventional centrifuges leads to considerable difficulties and/or to an uneconomical mode of operation since, from the beginning of the processing of starch, the conveying speed must be maintained at a low value, thereby leading to a relatively low output volume.

The present invention seeks to avoid the above-noted disadvantages by providing a process and apparatus for the continuous separation of suspensions which include solids tending to solidify under a mechanical stress due to the conveying motion and, in particular, starch.

According to the present invention, a solid-shell screw-conveyor centrifuge is provided having a screw rotating at a differential speed with respect to a rotatable shell with one of the shell or the screw being connected to an arbitrary drive mechanism and joined to the other of the shell or screw by a hydraulic motor supplied by way of a rotary transmission, wherein the speed of the hydraulic motor is initially set in accordance with a feed of a pressure medium so that the quantity of solid matter accumulated in the screw channels is such that an optimum load exerted by the conveying motion is reached, which optimum load lies slightly below the critical load necessary for triggering a solidification. Once this optimum load is attained, the feed of the pressure medium to the hydraulic motor is throttled in response to a signal indicative of the presence of such optimum load so that the load on the solid matter exerted by the conveying motion no longer rises due to a reduction in the differential speed between the rotating shell and the screw. When the load decreases below the optimum load, the differential speed between the shell and screw is increased in response to a signal indicative of the absence of the optimum load. The increase in the differential speed continues until the optimum load has once again been attained.

Since the solidification of solid matter is not obtained in a constant quantity per unit of time, in accordance with the present invention, the actual value or amount of solidification of the solid matter is continuously monitored by, for example, scanning the torque of the screw. In this arrangement, the differential speed between the shell and screw is reduced when a certain critical value of the solidification has been exceeded and/or when, for example, the screw torque, utilized as the measured value, has been exceeded, whereby the load on the solid matter due to the conveying motion is diminished. Due to the continuous monitoring of the condition of the solid matter and the controlling of the differential speed between the shell and the screw, optimum operating conditions of the centrifuge can readily be attained during the processing of suspensions which solidify due to the mechanical stresses.

As with suspensions having solids which tend to change their physical condition toward the liquid phase, the same principles apply to suspensions with solids tending to solidify under mechanical stresses with respect to the load on the solid matter and its relationship to the shell speed. Specifically, the smaller the centrifugal forces effective on the solid matter to be discharged, the lower the discharge power required for this purpose, thereby resulting in a smaller load on the solid matter.

Therefore, in accordance with another advantageous feature of the present invention, in processing suspensions with solids having a rheopexy behavior, the drive mechanism for the shell includes a hydraulic motor which is incorporated into the control process so as to control the speed of the shell to reduce the same in situations of a load on and/or solidification of the solid matter rising above a predetermined value.

If the solidification of the solid matter approaches a critical value, it is possible, in accordance with the present invention, to reduce the speed of the shell and, if the differential speed between the screw and shell is likewise reduced, a drastic reduction in the load on the solid matter is readily obtained.

Depending upon the size of the speed differential, it may be necessary to throttle the feed of the suspension in order to take into account any reduction in the discharge of solid matter from the centrifuge.

Another type of suspension which can be processed only with considerable difficulties is activated sludge. The difficulties in such situation are occasioned by the fact that the solid matter to be discharged has the tendency, by virtue of its sonstituents, to slide back into the pool along the flights of the conveyor screw when lifted out of the pool. To avoid this difficulty, it has been proposed to select a conveying speed which is higher than a backflow velocity of the solid matter in the suspension. A disadvantage of this proposal resides in the fact that the solid matter is discharged in a relatively wet state due to the relatively short time such solid matter exists in the separating chamber and in the drying zone. Additionally, a so-called packing density of the separated solid matter is so minor that the activated sludge cannot readily be deposited in a sanitary landfill.

The present invention avoids the difficulties encountered in processing a suspension such as activated sludge by providing a process and apparatus for the continuous separation of suspensions with solids of high water absorption and with low specific gravity differences with regard regard to the liquid of the suspension.

According to the present invention, a solid-shell screw-conveyor centrifuge having a screw rotating at a differential speed with respect to a rotatable shell is provided with one of the shell or screw being connected to a hydraulic shell drive motor and joined to the other of the screw or shell by a hydraulic motor supplied by way of a rotary transmission, wherein the pressure medium supplied to the hydraulic shell drive motor is initially set to be so high that the solid matter settles along an inner wall of the shell due to the high centrifugal force. A monitoring arrangement provides a signal indicative of an adjusted torque load of the screw with the aid of which a pressure medium supplied to the hydraulic shell drive motor and, optionally, additionally a pressure medium supplied to the hydraulic motor between the shell and the screw are reduced in such a way that a backflow of the solid matter to be transported out of the pool is avoided to a maximum degree.

A centrifuge constructed in accordance with the lastmentioned features is especially suitable for any solids having characteristics which change with respect to the backflow property on the flights of the conveying screw. These characteristics are exhibited by a correspondingly different load on the screw; therefore, an actual value derived therefrom can be utilized for controlling the speed of the shell so that such speed is adjusted to a value which prevents the backflow of solid material to a maximum degree.

However, depending upon the nature of the suspension to be separated, difficulties may be encountered in that the adjusted shell speed is no longer sufficient to exert an adequate centrifugal force on the solid matter to ensure the maximum settling of such matter toward the inner wall of the bowl.

To avoid this difficulty, in accordance with the present invention, a regulating or control unit is provided which affects the shell drive mechanism and also the screw drive mechanism at predetermined intervals so that an interval phase of a high bowl speed and an optionally reduced differential speed between the shell and the screw for the purposes of settling the solid matter, is followed by an interval phase of reduced shell speed and optionally increased differential speed for the discharge of the settled solid material, and vice versa. By virtue of this procedure, advantageously a satisfactory settling action can be achieved at relativey high shell speed and no consideration need be given to the discharge during this phase. As soon as a sufficient quantity of solid matter has been accumulated, an interval phase of a reduced shell speed is then initiated, during which the settled solid matter is discharged more or less without a backward sliding of the solid matter since the centrifugal force effective on the solid matter is correspondingly reduced at the reduced shell speed.

By virtue of the last-mentioned arrangement, solids which otherwise are difficult to settle and difficult to remove from the pool in the centrifuge can be deposited in a compact manner on a wall of the shell under a high centrifugal force and then, with a reduced centrifugal force occasioned by a reduction in the shell speed, the compact solid matter can then be conveyed with an approximately arbitrary velocity out of the pool and through a drying zone.

The operating conditions to be selected in each particular situation depend upon the consistency of the suspension to be processed. It is possible by virtue of the intermittent mode of operation or in a batch-wise procedure to maintain the feed of the suspension so that it is continuous or constant; however, it is also possible to vary the feeding of the suspension in a correspondingly adapted fashion.

It is also possible in accordance with the invention to merely control the intermittent operation, that is, to conduct the process according to a fixed predetermined time cycle; however, in order to maximize economy within a scope of an automatic processing operation, it is preferred to control the speed of the shell in dependence upon the conditions ambient within the shell. For example, if a sufficient quantity of solid matter is present, such presence will become evident by an increased torque on the screw of the centrifuge. This increased torque occurring during operation can be used as a control variable for the speed of the shell once the increased torque reaches a predetermined desired value.

The control process may include a varying differential speed between the screw and the shell, for example, in such a way that the screw, at a high shell speed, rotates relatively slowly with respect to the shell and this speed of rotation then rises in a phase or interval during which time the speed of the shell is reduced. It is also possible to utilize as the actual value the amount of discharged liquid insofar as the value is affected by differing accumulations of solid matter in the separating chamber.

Additionally, since the drive mechanism of the screw is supported on the shell, a simple possibility for obtaining the actual value resides in measuring the torque of the shell by scanning a pressure line of the hydraulic motor of the shell. The shell torque is proportional to the output quantity of the suspension being processed. For example, when a solid matter is processed which offers only little resistance to the screw, the difference of the screw torque in dependence on the quantity of solid matter may be too minor to obtain a measured value and an actual value signal to be derived therefrom.

Accordingly, it is an object of the present invention to provide a process and apparatus for the treatment of suspensions which avoid the shortcomings and drawbacks encountered in the prior art.

Another object of the present invention resides in providing a process and apparatus for the treatment of suspensions which include solids which tend to change their physical condition toward a liquid phase or tend to solidify into larger units within a range of thermal and/or mechanical loads.

Still another object of the present invention resides in providing a process and apparatus for the treatment of suspensions which include solid matter which has the tendency to slide back into a pool of the centrifuge along the flights of the conveyor screw when such solid matter is lifted out of the pool.

These and other objects, features and advantages of the present invention will become more apparent from the following description when taken in connection with the accompanying drawings which show, for the purposes of illustration only, one embodiment in accordance with the present invention, and wherein.

Figure 1:
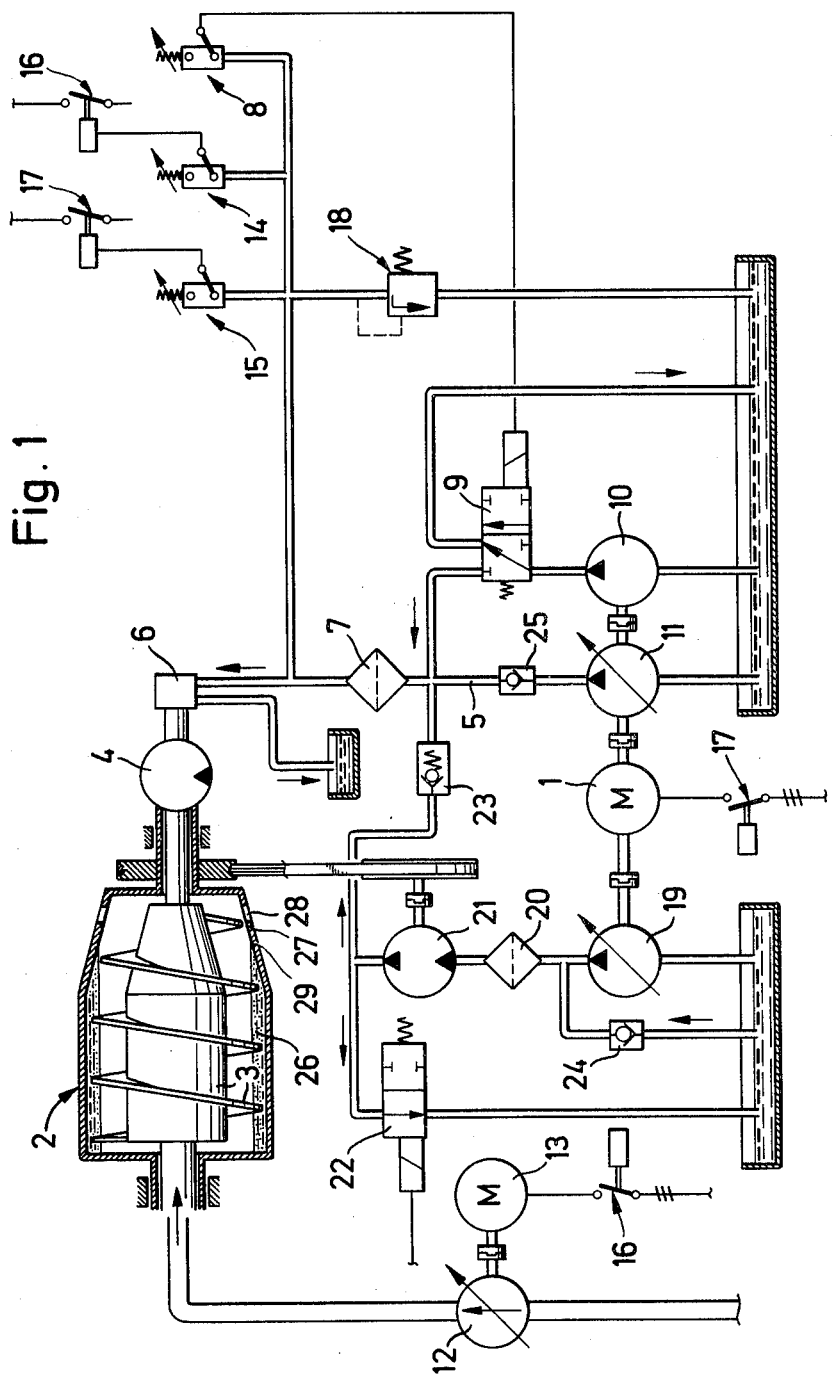
FIG. 1 is a schematic illustration of an apparatus for the treatment of suspensions in accordance with the present invention.

Referring now to the drawings wherein like reference numerals are used throughout the various views to designate like parts and, more particularly, to FIG. 1, according to this figure, a solid-shell screw-type centrifuge includes a shell 2 surrounding a helical screw 3 supported in the shell 2 in a conventional manner. A single drive motor 1 indirectly drives the centrifuge shell 2 as well as the screw 3 with the screw leading or trailing with respect to the shell 2 by a predetermined differential speed.

In operation, a suspension forms a hollow cylindrical pool 26 terminating in a conical bowl section 27 at a position generally designated by the reference numeral 29 in front or upstream of a discharge opening 28. In this manner, solid matter conveyed through the helix of the screw 3 is lifted out of the pool 26 and transported by way of a drying zone of the discharge opening 28, whereby the solid matter is dried.

The screw 3 is drivingly connected with the bowl 2 by way of a hydraulic motor 4 mounted on the drive shaft of the screw 3 with the screw 3 rotating relative to the shell 2. The hydraulic motor 4 is coupled to the shell 2 through the housing or stator of the motor 4. The rotor of the hydraulic motor moves relative to the stator or housing depending upon the amount of pressure medium supplied thereto by way of a pressure conduit 5. A rotary transmission 6 is connected between the drive motor 4 and the conduit 5 for controlling the fluid supply. The rotary transmission 6 is preferably of the type described in Swiss Pat. Nos. 526,061 and/or 545,933 corresponding to U.S. Pat. Nos. 3,685,842 and 3,767,213. The rotary transmission 6 ensures that the pressure medium can flow without appreciable leakage losses from the fixed pressure conduit 5 to the hydraulic motor 4 and again return from the hydraulic motor 4.

As the quantity of pressure medium supplied to the hydraulic motor 4 increases by way of the pressure conduit 5, wherein a filter 7 is disposed, and by way of the rotary transmission 6, then the differential speed of the screw 3 relative to the shell 2 increases. If the load on the screw 3, increased by any number of causes, requires a larger driving torque to maintain the prescribed differential speed, then the pressure within the conduit 5 is increased. This increase in pressure is introduced into an actual-desired value comparator valve 8 and, upon the actual pressure surpassing the pressure applied by way of a spring bias which corresponds to a preset desired value at the comparator valve 8, a multichannel or multiple-way valve 9 is switched by way of a transmission line between the comparator valve 8 and the valve 9, which line may, for example, be an electrical line.

The switching of the valve 9 connects a previously disconnected auxiliary pump 10 into a supply line which feeds the pressure conduit 5. Thus, if the actual pressure within the conduit 5 exceeds a prescribed value, as determined by the comparator valve 8, then the conduit 5 is supplied with a combined pressure medium from the auxiliary pump 10 and a primary pump 11 in view of the action of the valve 9.

In a normal operation, when the valve 9 is connected as shown in FIG. 1, so that the output of the pump 10 is returned to a fluid supply tank, the fluid supplied to the hydraulic motor 4 is provided only by way of the primary pump 11 which, incidently, may be controllable so as to supply a variable amount of fluid pressure to the conduit 5 to control the differential speed between the shell 2 and screw 3.

In place of a controllable primary pump 11, a nonadjustable or fixed fluid pressure pump may be used and a pressure and/or amount of fluid within the conduit 5 may be controlled by a bypass valve arrangement. The bypass valve arrangement can be interconnected in a manner similar to the pump 10; however, an infinitely variable control of the fluid pressure is achievable in this connection. Of course, it is possible to provide, in place of the valve 9, connecting the pump 10 to the conduit 5, a more sensitive or variable type of control.

Moreover, in place of a single auxiliary pump 10, several such auxiliary pumps can be arranged which are connected and/or disconnected in sequence or series, depending on the magnitude of a control signal.

The pumping system for supplying the hydraulic motor 4 or the drive of the screw 3 includes a primary pump 11 and an auxiliary pump 10 driven by the same drive motor 1 which causes rotation of the shell 2. However, such a central drive motor is not absolutely necessary.

The left-hand portion of FIG. 1 illustrates a schematic supply arrangement for supplying material to be separated from the centrifuge which includes a feed pump 12 driven by a motor 13. In the present embodiment, although the control circuit is not influenced by the material input side, it is possible to employ this as a criterion for shutting off the system. More importantly, it is noted that any change in the quantity and/or consistency of the fed material, which is to be separated, will influence the regulating quantity value.

Safety measures are provided in the form of pressure sensors 14, 15 shown in the right-hand portion of FIG. 1. Pressure sensor 14 is activated upon the exceeding of a prescribed pressure. Upon detection by the pressure sensor 14 that a prescribed pressure has been exceeded, a signal is coupled to the switch 16 to interrupt the supply of material to be separated in the centrifuge by interrupting the power supply to the motor 13.

Pressure sensor 15 serves as a safety switch used, for example, when the screw 3 is suddenly blocked with respect to the shell 2 which, in turn, results in a corresponding sudden pressure increase in the conduit 5. In this case, the output of the pressure sensor 15 being coupled to the switch 17 deactivates the drive motor 1 and brings the rotation of the shell 2 to a halt. A further safety pressure-limiting or pressure-relief valve 18 is coupled to the conduit 5.

The drive motor 1 operates an additional pump 19 which is controllable in the same manner as the pump 11. The pump 19 supplies through a filter 20 a further hydraulic motor 21 having a mechanical output or drive section for driving the shell 2 by way of a V-belt and pulley drive.

To control the speed of the hydraulic motor 21, it is possible, for example, to adjust the pump with respect to the amount of pressure medium to be conveyed from the pump to the motor 21. A throttling means may also be inserted in the conduit between the pump 19 and the hydraulic motor 21.

Assuming that an actual value to be adjusted is determined by scanning the pressure in the feed conduit for the hydraulic motor 4 of the screw 3 in a manner similar to the scanning by the actual-desired valve comparator valve 8, it is possible, by providing a multi-channel valve such as the valve 9 for the auxiliary pump 10, to influence the amount of pressure medium conveyed by the pump 19 by adjusting the throttling means or the like arranged in the conduit between the pump 19 and the hydraulic motor 21.

It would also be possible to insert a throttle means for affecting the speed of the hydraulic motor 21 for the shell 2 in a return line from the motor 21 to a collecting tank for the pressure medium.

By virtue of the adjustability of the pump 19, the supply of the pressure medium thereto may be prevented, for example, by throttling and, consequently, in such a situation, no pressure medium would be supplied from the pump 19 to the hydraulic motor 21. When this occurs, the shell 2 drives the hydraulic motor 21 due to the inertia, i.e. the rotational kinetic energy inherent in the centrifuge causing the hydraulic motor 21 to operate as a pump. A throttle means and/or a switching device 22 is arranged in a return line between the hydraulic motor 21 and a pressure medium collecting tank, thereby making it possible for the hydraulic motor 21, in its pumping function, to operate against a resistance caused by the throttle means and/or switching device 22. To provide a control over the pumping effect of the hydraulic motor 21, the resistance of the throttle means and/or switching device 22 may be adjustable.

With the hydraulic motor 21 being driven by the shell 2 and functioning as a pump operating against a resistance caused by the throttle means and/or switching device 22, it is possible for the hydraulic motor to exert a braking torque on the shell 2, whereby a rapid control of the shell speed, insofar as it is intended, is greatly enhanced. Additionally, such a braking action by the hydraulic motor 21 provides the advantage that the separating chamber of the centrifuge can be completely emptied when the centrifuge unit is shut down, for the pool rotating with the shell runs, when the shell is braked, due to its mass moment of inertia, along the channels of the conveyor screw 3 and passes, depending upon the direction of inclination of the shell, to the solid discharge end or to the other end of the shell 2 where the liquid discharge end is provided in a countercurrent flow centrifuge construction. Such a residual emptying action is of considerable significance in situations wherein a suspension being processed includes substances which tend toward solidification, curing or the like when the centrifuge is at a standstill. As can be appreciated, any solidification in the centrifuge would result in an impairing or an elimination of any mobility between the shell 2 and the screw 3.

The utilization of the hydraulic motor as a pump is significant for imparting an emergency braking operation of the shell 2 in the event of a failure of a pressure medium supply to the hydraulic due to any number of causes. Specifically, if the pressure medium supply for the hydraulic motor 4 fails, the lack of a supply of pressure medium may result in a destruction of the rotary transmission, especially if the shell 2 is permitted to freely rotate with the rotation gradually slowing down, that is, permitted to rotate without any positive braking action.

To ensure that the rotary transmission 6 is lubricated as long as the shell 2 is rotating, a check valve 23 is arranged between the pump outlet of the hydraulic motor 21 and the conduit 5. The line in which the check valve 23 is arranged communicates with the conduit 5 between the primary pump 11 and the rotary transmission 6. By virtue of this arrangement, if the pressure in the conduit 5 fails, due to any number of causes, it is possible to supply a pressure medium to the conduit 5 by way of the check valve 23 as soon as the return conduit between the output of the hydraulic motor 21 and the collecting tank is blocked by the throttling means and/or switching device 22.

The throttling and/or switching device 22 can be controlled, for example, by a pressure monitoring device connected to the conduit 5, which pressure monitoring device may take the form of the pressure sensors 14, 15.

To ensure that the motor 21, when operating as a pump, can draw in a pressure medium fluid, the pump 19 is bridged or bypassed by way of a check valve 24.

Furthermore, in order to ensure a supply of pressure medium to the conduit 5 through check valve 23 from the hydraulic motor 21 when operating as a pump and to avoid a dischange of the supplied pressure medium due, for example, to a defective main pump 11 so that such pressure medium could not be employed for lubricating the rotary transmission 6, a further check valve 25 is arranged between the line in which the check valve 23 is arranged and the outlet of the main pump 11.

The control arrangement of the present invention operates as follows:

Upon a reduction in the differential speed between the screw 3 and the shell 2 due to an increase in mechanical load on the screw 3, the pressure rises in the conduit 5, thereby resulting in a further supply of pressure medium to the pressure conduit from the auxiliary pump 10.

Once the differential speed between the screw 3 and the shell 2 has increased again due to the additional supply of pressure medium, the pressure of the pressure medium in the conduit 5 decreases accordingly. Upon this occurrence, the actual value-desired value comparative valve 8 interrupts a control signal to the multichannel valve 9 to return the valve 9 to the idling position illustrated in FIG. 1. Upon the interruption of the signal to the valve 9, the auxiliary pump is deactivated, thereby stopping the supply of pressure medium from the auxiliary pump to the pressure conduit 5.

If the increase in the differential speed is to be combined simultaneously with a reduction in the speed of the shell 2, and output signal of the actual value-desired valve comparator valve 8 is fed to an adjusting means for the pump 19 to reduce the amount of pressure medium conveyed by the pump 19. This type of control operation would be employed for the treatment of substances which are difficult to settle, such as activated sludge as well as the treatment of suspensions with thermoplastic synthetic resins if simultaneously a change in the speed of the shell 2 is to be provided for this purpose.

However, if suspensions are processed with solids exhibiting rheopexy, it is possible to lower, with a decreasing differential speed, simultaneously the speed of the shell 2. In this instance, the actual value-desired value comparator valve 8 provides a signal to an adjusting unit for the pump 11 as well as a signal to an adjusting unit for the pump 19 so as to reduce the conveying power of the screw 3. Moreover, the shell 2 may be braked by operating the hydraulic motor 21, driven by the shell 2, as a pump operating against a resistance in the manner described hereinabove.

A further control possibility is realized by utilizing the connection between the output of the hydraulic motor 21 and the pressure conduit 5 through the check valve 23 to increase the supply of pressure medium in the conduit 5 to the hydraulic motor 4 through the pump action of the hydraulic motor 21 during the braking of the shell 2. By virtue of this arrangement, the differential speed is increased with a reduced speed of the shell 2 by enhancing the power of the auxiliary pump 10. It is also possible in this last-mentioned instance to dispense with the auxiliary pump 10 in certain circumstances such as, for example, in the treatment of activated sludge suspensions.

Since all of the return conduits respectively terminate in a collecting tank, it is possible to provide a closed circuit for the pressure medium of the centrifuge system.

Figure 2:
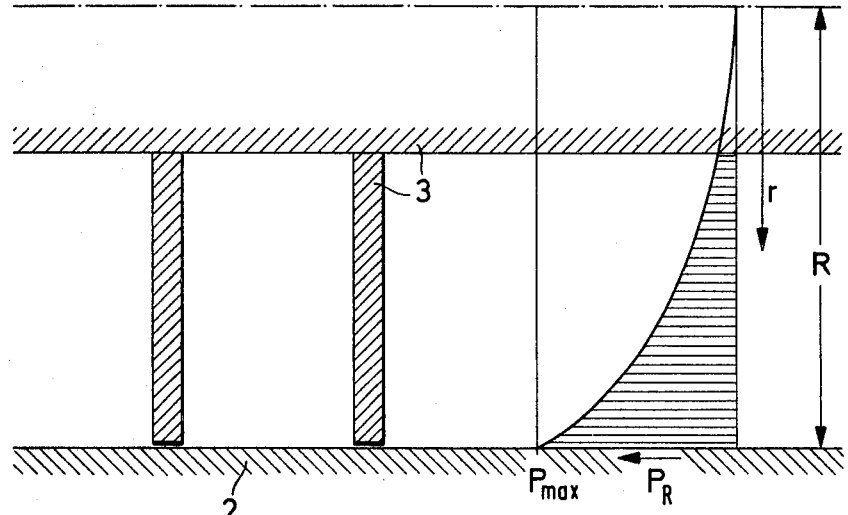
FIG. 2 is a partial cross-sectional schematic view of the centrifuge of FIG. 1 illustrating the dependency of the pressure acting upon the solid matter in contact with an inner wall of the shell of the centrifuge on the radius of the inner chamber of the shell.

FIG. 2 shows, on an enlarged scale, the configuration of a partial section of the inner chamber of the shell 2 and the screw 3. The curve illustrated in the chamber provides an indication as to how the pressure increases toward the inner wall of the shell 2 in dependence upon the radius r of the inner chamber of the shell 2 and such pressure assumes a value of $P_r$. If this pressure exerted on the solid matter at the inner wall of the shell 2 exceeds a maximum value $P_{max}$, then a plasticizing of thermoplastic solid material will occur on the inner wall of the shell 2.

Figure 3:
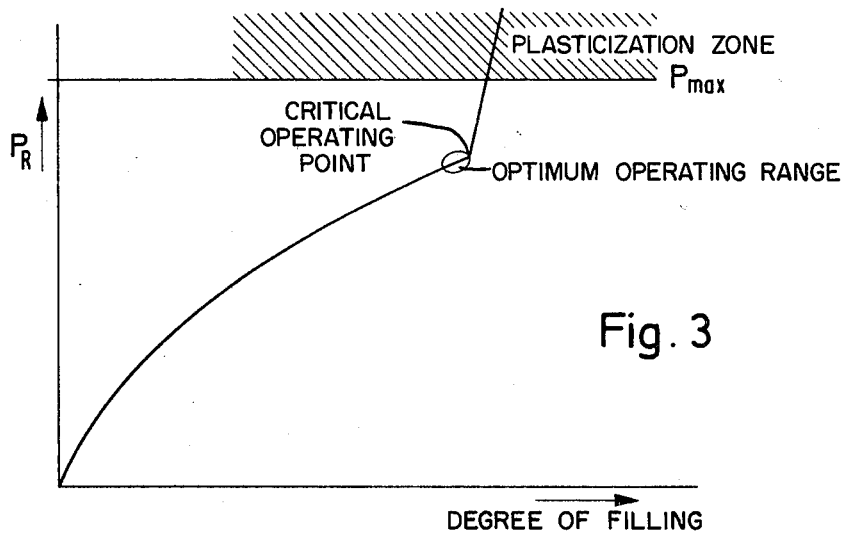
FIG. 3 is a diagram illustrating the dependence of pressure on the degree of filling of the centrifuge in the apparatus of FIG. 1.

The diagram in FIG. 3 provides an illustration of the dependence of the pressure $P_r$ on the degree of filling, that is, the filling of the conveying channels of the screw 3 with solid matter in a zone of the transition from the pool to the discharge end for the solid matter. The course of the curve indicates that the curve is deflected steeply in an upward direction starting with a predetermined critical point. The bend in the curve denotes the complete filling of the conveyor helix of the screw 3. By an additional feeding of solid matter to the screw 3, the pressure load is greatly increased and the plasticizing range is very quickly attained. The control zone for the controlling process referred to hereinabove lies in an area shortly below the critical operating point since it is desirable to fill the helix of the screw 3 up to the hub of the screw 3 in order to obtain maximum efficiency in the operation of the centrifuge.

While I have shown and described only one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. In a solid-shell screw-type conveyor centrifuge system, the centrifuge having a screw which rotates at a differential speed with respect to the shell, one of the shell and the screw being coupled to a drive mechanism and the other of the shell and screw being rotated by means of a hydraulic motor, the improvement comprising: means for sensing an accumulation of solid matter in conveying channels of the screw, means for comparing the sensed accumulation of solid matter with a desired optimum accumulation of solid matter, and means for controlling the differential speed between the shell and the screw in response to a signal from said comparing means such that the differential speed is increased upon an accumulation of solid matter above the desired optimum value until such time as the accumulation of solid matter returns to the desired optimum accumulation of solid matter.

2. A solid-shell screw-type conveyor centrifuge system according to claim 1, wherein the system is used for the separation of suspensions which include solid matter tending to soften under at least one of temperature and pressure loads.

3. A solid-shell screw-type conveyor centrifuge system according to claim 1, wherein the system is used for the separation of suspensions having thermoplastic synthetic resin particles contained in a solution.

4. A solid-shell screw-type conveyor centrifuge system according to claim 1, wherein the drive mechanism includes a hydraulic drive motor, and wherein said hydraulic drive motor simultaneously serves as a portion of said control means for controlling the differential speed between the shell and the screw upon an accumulation of solid matter above the desired optimum value.

5. A solid-shell screw-type conveyor centrifuge system according to claim 4, wherein said sensing means senses a torque load on the screw.

6. A solid-shell screw-type conveyor centrifuge system according to claim 5, wherein the torque load on the screw is sensed by determining a pressure condition of a supply conduit for the hydraulic motor.

7. In a solid-shell screw-type conveyor centrifuge system, the centrifuge having a screw which rotates at differential speed with respect to the shell, one of the shell and the screw being coupled to a drive mechanism and the other of the shell and screw being rotated by means of a hydraulic motor, the improvement comprising: means for sensing a value indicative of at least one of a maximally permissible load and a solidification limit of solid matter treated in the system, means for comparing the sensed value with an optimum critical value, and means for controlling the differential speed between the shell and the screw in response to a signal from said comparing means such that the differential speed is reduced upon the value of at least one of the maximally permissible load and solidification of the solid matter increasing beyond the optimum critical value.

8. A solid-shell screw-type conveyor centrifuge system according to claim 7, wherein the system is used for separation of suspensions which include solid matter tending to solidify under a load due to a conveying motion of the screw.

9. A solid-shell screw-type conveyor centrifuge system according to claim 7, wherein the system is used for the separation of a suspension which includes starch.

10. A solid-shell screw-type conveyor centrifuge system according to claim 7, wherein the drive mechanism includes a hydraulic drive motor, and wherein said hydraulic drive motor simultaneously serves as a portion of said control means for controlling the differential speed between the shell and the screw upon the value of at least one of the maximally permissible load and solidification of the solid matter increasing beyond the optimum critical value.

11. A solid-shell screw-type conveyor centrifuge system according to claim 10, wherein said sensing means senses a torque load on the screw.

12. A solid-shell screw-type conveyor centrifuge system according to claim 11, wherein the torque load on the screw is sensed by determining a pressure condition of a supply conduit for the hydraulic motor.

13. In a solid-shell screw-type conveyor centrifuge system, the centrifuge having a screw which rotates at a differential speed with respect to the shell, one of the shell and the screw being coupled to a drive mechanism and the other of the shell and screw being rotated by means of a hydraulic motor, the improvement comprising: means for controlling at least one of the differential speed between the shell and the screw and the speed of the shell, wherein the drive mechanism includes a hydraulic drive motor, said hydraulic drive motor simultaneously serving as a portion of said control means for controlling the speed of the shell.

14. A solid-shell screw-type conveyor centrifuge system according to claim 13, wherein the system is used for the separation of suspensions with solid matter having a high water absorption.

15. A solid-shell screw-type conveyor centrifuge system according to claim 13, wherein the system is used for the separation of suspensions with solid matter having low specific gravity differences with respect to a liquid of the suspension.

16. A solid-shell screw-type conveyor centrifuge system according to claim 13, wherein the centrifuge system is used for the treatment of activated sludge.

17. A solid-shell screw-type conveyor centrifuge system according to claim 13, wherein said control means control the rotational speed of the screw and shell in intervals such that an interval of a high shell speed with a reduced differential speed between the shell and screw for the purposes of settling of solid matter is followed by an interval of a reduced shell speed and increased differential speed for a discharge of settled solid matter.

18. A solid-shell screw-tye conveyor centrifuge system according to claim 17, wherein means are provided for sensing a torque load on the screw.

19. A solid-shell screw-type conveyor centrifuge system according to claim 18, wherein said sensing means senses a pressure condition of a supply conduit for the hydraulic motor.

20. A process for the continuous separation of suspensions which have solid matter which tend to plasticize under at least one of a temperature and pressure load, the process comprising the steps of:
supplying a suspension to a solid-shell screw-conveyor centrifuge having a screw rotatable at a differential speed with respect to a rotatable shell; and
controlling the differential speed and discharge of solid matter so as to continually maintain an optimum height of accumulated solid matter throughout the entire processing of the suspension.

21. A process according to claim 20, wherein the step of controlling comprises:
providing a drive mechanism for driving one of the shell and screw and joining the other of the shell and screw by a hydraulic motor supplied by a rotary transmission;
setting an initial speed of the hydraulic motor at a low value so as to cause an accumulation of solid matter at least in an area of a discharge opening of the centrifuge;
monitoring the height of the accumulation of solid matter throughout the processing of the suspension so as to determine the existence of the height of the accumulated solid matter;
providing a signal indicative of the existence of an optimum height of accumulated solid matter; and
varying the differential speed and discharge of solid matter upon a receiving of a signal indicative of the existence of the optimum height of the accumulation of solid matter so as to maintain such optimum height during the processing of the suspension.

22. A process according to claim 21, wherein the step of varying the differential speed comprises:
increasing the differential speed to a speed sufficient to maintain the optimum height of accumulation of solid matter; and
lowering the differential speed in the event the optimum height of accumulation of solid matter is one of exceeded or decreased until a signal is received indicative of the reattainment of the optimum height of the accumulation of solid matter.

23. A process according to claim 22, wherein the step of increasing the differential speed comprises increasing the supply of a pressure medium to the hydraulic motor.

24. A process according to claim 23, wherein the step of supplying a suspension comprises supplying a suspension which includes thermoplastic synthetic resins contained in a solution due to precipitation.

25. A process according to claim 24, wherein the step of providing a signal comprises sensing a torque load applied on the screw of the centrifuge.

26. A process according to claim 21, wherein the drive mechanism is provided for driving the shell, the drive mechanism including a hydraulic drive motor, and wherein the step of varying the differential speed and discharge of solid matter comprises:
reducing the speed of the hydraulic drive motor to reduce the rotational speed of the shell upon receiving a signal of the existence of the optimum height of the accumulated solid matter; and
increasing the speed of the hydraulic drive motor to increase the rotational speed of the shell if the height of the accumulated solid matter decreases below the optimum height until the optimum height is once again reached.

27. A process for the continuous separation of suspensions which include solids tending to solidify under load due to a conveying motion, the process comprising the steps of:
supplying a suspension to a solid-shell screw-conveyor centrifuge having a screw rotatable at a differential speed with respect to a rotatable shell; and
controlling the differential speed between the rotatable screw and rotatable shell so as to accumulate a quantity of solid matter in the centrifuge which is consistent with an optimum load exerted by a conveying motion of the screw, which optimum load lies below a critical load tending to solidify the solids in the suspension.

28. A process according to claim 27, wherein the step of controlling comprises:
providing a drive mechanism for driving the shell and screw;
drivingly connecting the screw with the shell by a hydraulic motor supplying the hydraulic motor by a rotary transmission;
setting an initial speed of the hydraulic motor which controls a fluid supply to the hydraulic motor at a value sufficient to cause an accumulation of solid matter reflective of the optimum load;
monitoring the load throughout the processing of the suspension to determine a continued existence of the optimum load;
providing a signal indicative of the existence of the optimum load; and
varying the differential speed upon receiving a signal of the existence of the optimum load so as to maintain such optimum load during an active processing of the suspension.

29. A process according to claim 28, wherein the step of varying the differential speed comprises:
reducing the differential speed to a speed commensurate with the optimum load; and
increasing the differential speed in the event the optimum load is no longer reached until a further signal is received indicative of the reattainment of the optimum load.

30. A process according to claim 29, wherein the step of reducing the differential speed comprises throttling the feed of a pressure medium to the hydraulic motor.

31. A process according to claim 29, wherein the step of supplying a suspension comprises supplying a suspension which includes a starch as the solid matter.

32. A process according to claim 31, wherein the step of providing a signal comprises sensing a torque load on the screw of the centrifuge.

33. A process according to claim 27, wherein the shell is driven by the drive mechanism, said drive mechanism including a hydraulic drive motor, and wherein the step of varying the differential speed comprises reducing the speed of the shell when the optimum load exerted by the conveying motion is reached and increasing the speed of the shell when the optimum load falls below a predetermined value.

34. A process for the continuous separation of suspensions which include solids having at least one of a high water absorption and a low specific gravity difference with respect to the liquid of the suspension, the process comprising the steps of:
supplying the suspension to a centrifuge having a rotatable screw and a shell rotatable at variable differential speeds; and
controlling at least one of the differential speed and a speed of the shell so as to maximally reduce the backflow of a solid matter to be transported out of the centrifuge.

35. A process according to claim 34, wherein the step of controlling comprises:
providing a drive mechanism including a hydraulic drive motor for driving the shell;
drivingly connecting the screw to the shell by a hydraulic motor supplying the hydraulic motor by a rotary transmission which controls a fluid supply to the hydraulic motor;
setting an initial speed of the hydraulic drive motor at a high value so as to cause the solid matter to settle along an inner wall of the shell due to a high centrifugal force;
sensing the torque load on the screw of the centrifuge and providing a signal of the torque load; and
reducing at least one of the differential speed and speed of the shell to a speed sufficient to prevent a backflow of the solid matter along the screw.

36. A process according to claim 35, wherein the step of reducing the differential speed comprises reducing a supply of pressure medium to the hydraulic drive motor to reduce the speed of the shell.

37. A process according to claim 36, wherein the step of reducing the differential speed further comprises reducing a supply of pressure medium to the hydraulic motor connecting the shell and screw.

38. A process according to claim 37, further comprising the step of controlling the reducing of the supply of pressure medium to the hydraulic drive motor and hydraulic motor in intervals such that an interval of high bowl speed and a reduced differential speed is followed by an interval of reduced bowl speed and an increased differential speed.

39. A process according to claim 36, further comprising the step of controlling the reducing of the supply of pressure medium to the hydraulic drive motor in intervals such that an interval of high bowl speed is followed by an interval of reduced bowl speed.

* * * * *